US009568378B2

(12) United States Patent
DeSilva (10) Patent No.: US 9,568,378 B2
(45) Date of Patent: Feb. 14, 2017

(54) MULTI FUNCTIONAL SENSOR SYSTEM FOR GAS TURBINE COMBUSTION MONITORING AND CONTROL

(71) Applicant: Upul P. DeSilva, Oviedo, FL (US)

(72) Inventor: Upul P. DeSilva, Oviedo, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 490 days.

(21) Appl. No.: 14/109,992

(22) Filed: Dec. 18, 2013

(65) Prior Publication Data
US 2015/0168228 A1  Jun. 18, 2015

(51) Int. Cl.
| G01K 11/22 | (2006.01) |
| F23N 5/10 | (2006.01) |
| F23N 5/16 | (2006.01) |
| F23R 3/44 | (2006.01) |

(52) U.S. Cl.
CPC .......... *G01K 11/22* (2013.01); *F23N 5/10* (2013.01); *F23N 5/16* (2013.01); *F23R 3/44* (2013.01); *F23N 2023/00* (2013.01); *F23N 2025/08* (2013.01); *F23N 2041/20* (2013.01)

(58) Field of Classification Search
None
See application file for complete search history.

(56) References Cited

U.S. PATENT DOCUMENTS

| 2007/0062196 A1 | 3/2007 | Gleeson et al. |
| 2010/0076698 A1* | 3/2010 | He .......... F23N 5/242 |
| | | 702/35 |
| 2012/0150413 A1* | 6/2012 | Bunce ....... F02C 9/28 |
| | | 701/100 |

FOREIGN PATENT DOCUMENTS

| EP | 1602904 A1 | 12/2005 |
| WO | 2014159600 A1 | 10/2014 |

* cited by examiner

*Primary Examiner* — Erica Lin (57) ABSTRACT

Thermoacoustic sensors, such as dynamic pressure sensors, in the combustor measure vibratory responses of the combustor. An integrated monitoring and control system controller correlates sensor readings with combustion thermoacoustic properties in order to identify combustion anomalies by wavelet or Fourier analysis techniques; determine bulk temperature characteristics within the combustor with dominant mode frequency analysis techniques; and optionally determines absolute active path temperatures within the combustor with acoustic pyrometry transmission and time-of-flight analysis techniques. In some embodiments all of the monitoring functions are performed with a commonly shared array of thermoacoustic sensors that function as both combustion dynamics thermoacoustic vibration/wave receivers and acoustic transmitters. The monitored combustion properties are used for controlling gas turbine combustion.

8 Claims, 5 Drawing Sheets

MULTI FUNCTIONAL SENSOR SYSTEM FOR GAS TURBINE COMBUSTION MONITORING AND CONTROL

CROSS-REFERENCE TO RELATED APPLICATIONS

This application incorporates by reference the following co-pending United States utility patent applications in their entirety as if fully set forth herein:

"Active Temperature Monitoring In Gas Turbine Combustors" filed concurrently on the same date, Ser. No. 14/132,001, file Dec. 18, 2013 (Siemens 230);

"Gas Turbine Engine Control Using Acoustic Pyrometry", filed on Dec. 14, 2010, Ser. No. 12/967,148, Publication No. US2012/0150413; and "Temperature Measurement in a Gas Turbine Engine Combustor", filed on Mar. 14, 2013, Ser. No. 13/804,132.

This application also incorporates by reference in its entirety as if fully set forth herein U.S. Pat. No. 7,853,433, "Combustion Anomaly Detection Via Wavelet Analysis of Dynamic Sensor Signals", issued Dec. 14, 2010.

BACKGROUND OF THE INVENTION

1. Field of the Invention

The invention relates to combustion monitoring and control, including anomaly detection and classification, in combustors of gas turbine engines, including by way of example industrial gas turbine (IGT) engines, other types of stationary gas turbine, marine, aero and other vehicular gas turbine engines. More particularly, embodiments of monitoring and control methods and apparatus disclosed herein utilize a common sensing and control system for combustor temperature determination as well as combustion anomaly detection and classification. In embodiments disclosed herein an array of thermoacoustic sensors, acoustic transmitters and/or transceivers are utilized for one or more of real-time active combustor temperature determination, anomaly detection or anomaly classification.

2. Description of the Prior Art

Combustion turbines, such as gas turbine engines, generally comprise a compressor section, a combustor section, a turbine section and an exhaust section. In operation, the compressor section inducts and compresses ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

Combustion anomalies, such as flame flashback, have been known to occur in combustion sections of gas turbine engines. Flame flashback is a localized phenomenon that may be caused when a turbulent burning velocity of the air and fuel mixture exceeds an axial flow velocity in the combustor assembly, thus causing a flame to anchor onto one or more components in/around the combustor assembly, such as a liner disposed around the combustion chamber. The anchored flame may burn through the components if a flashback condition remains for extended periods of time without correction thereof. Thus, flame flashback and/or other combustion anomalies may cause undesirable damage and possibly even destruction of combustion engine components, such that repair or replacement of such components may become necessary.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter that may be used to monitor the operating condition of the engine. For example, a controller may monitor a measured turbine exhaust temperature, and a measured change in temperature at the exhaust may result in the controller changing an operating condition of the engine.

At present, there are several different types of sensors and sensing systems that are being used in the industry for monitoring combustion and maintaining stability of the combustion process for engine protection. For example, dynamic pressure sensors are being used for combustion stability and resonance control. Passive visual (optical visible light and/or infrared spectrum) sensors, ion sensors and Geiger Mueller detectors are used to detect flame on/off in the combustor, while thermocouples are being used for flashback detection.

Particularly, U.S. Pat. No. 7,853,433 detects and classifies combustion anomalies by sampling and subsequent wavelet analysis of combustor thermoacoustic oscillations representative of combustion conditions with sensors, such as dynamic pressure sensors, accelerometers, high temperature microphones, optical sensors and/or ionic sensors. United States Publication No. US2012/0150413 utilizes acoustic pyrometry in an gas turbine exhaust system to determine upstream bulk temperature within one or more of the engine's combustors. Acoustic signals are transmitted from acoustic transmitters and are received by a plurality of acoustic receivers. Each acoustic signal defines a distinct line-of-sound path between a corresponding transmitter and receiver pair. Transmitted signal time-of-flight is determined and processed to determine a path temperature. Multiple path temperatures can be combined and processed to determine bulk temperature at the measurement site. The determined path or bulk temperature or both can be utilized to correlate upstream temperature in the combustor. Co-pending U.S. utility patent application Ser. No. 13/804,132 calculates bulk temperature within a combustor, using a so-called dominant mode approach, by identifying an acoustic frequency at a first location in the engine upstream from the turbine (such as in the combustor) and using the frequency for determining a first bulk temperature value that is directly proportional to the acoustic frequency and a calculated constant value. A calibration second temperature of the working gas is determined in a second location in the engine, such as the engine exhaust. A back calculation is performed with the calibration second temperature to determine a temperature value for the working gas at the first location. The first temperature value is compared to the back calculated temperature value to change the calculated constant value to a recalculated constant value. Subsequent first temperature values at the combustor may be determined based on the recalculated constant value.

Thus, different adverse conditions related to combustion currently require separate sensor designs and/or separate sensing systems to detect those conditions. Known combined gas turbine and other types of gas turbine engine monitoring and control system sensor and detection approaches have not covered all possible adverse combustion fault detections. Installation of different types of disparate sensors and sensing systems in a single gas turbine increases installation cost and maintenance expense. Also, the disparate sensors and sensing systems inherently introduce response lags and delays in the overall gas turbine control system.

Thus, a need exists in the art for an integrated gas turbine monitoring and control system for detecting a broad range of possible combustor failures or, more satisfactorily precursors to faults, during combustion, sharing common sensors and, if desired, a common controller.

Another need exists in the art for an gas turbine active temperature monitoring system that determines actual combustor temperature in real time without the need to obtain reference temperatures from other locations within the engine, such as known bulk temperature systems that back calculate combustor temperature based on temperature measurements obtained in the engine exhaust system.

An additional need exists for an active temperature monitoring system that shares sensors commonly used with gas turbine monitoring and control systems, so that active temperature monitoring can be integrated within the monitoring and control system.

SUMMARY OF THE INVENTION

An object of embodiments of the invention is creation of an integrated gas turbine monitoring and control system for detecting a broad range of possible combustor failures or, more satisfactorily precursors to faults, during combustion, sharing common sensors and, if desired, a common controller.

Another object of embodiments of the invention is creation of an gas turbine active temperature monitoring system that determines actual combustor temperature in one or more combustors in real time without the need to obtain reference temperatures from other locations within the engine, such as known bulk temperature systems that back calculate combustor temperature based on temperature measurements obtained in the engine exhaust system.

An additional object of embodiments of the invention is creation of an active temperature monitoring system that shares sensors commonly used with gas turbine monitoring and control systems, so that active temperature monitoring can be integrated within the monitoring and control system.

These and other objects are achieved in one or more embodiments of the invention by a combustion monitoring and control system that can identify and classify combustion anomalies and actively control the gas turbine combustion process within the engine combustors. Embodiments of this system incorporate at least a pair of thermoacoustic dynamic pressure sensors that are selectively arrayed in the combustor. The thermoacoustic sensors measure vibratory responses of the combustor that are generated within the combustion process with a high sensitivity. Sensor outputs are utilized in the monitoring and control system controller to identify anomalies using wavelet analysis or known Fourier analysis techniques. Bulk temperature is also monitored using acoustic frequency analysis techniques.

Optionally acoustic pyrometry-based active temperature monitoring is incorporated into the monitoring and control system, alone or with other embodiments of the invention described herein, by addition of an acoustic transmitter or acoustic transceiver that transmits a sound wave in a line-of-sight with at least one paired thermoacoustic sensor or a plurality of thermoacoustic sensors. Sound transmission time-of-flight is measured by the controller and correlated with path temperature along the line-of-sight. The active path temperatures may be processed by the controller to determine combustor bulk temperature. The path(s) of acoustic transmission across the combustor gas path serve as the absolute temperature measurement. In some embodiments the combustor acoustic pyrometry system is used for calibrating the passive bulk temperature measurement using the dominant mode approach. Thus the active path temperature determined by acoustic pyrometry methods can be utilized as the second or reference temperature reading for calibrating and corroborating acoustic frequency based bulk temperature monitoring systems, when they are incorporated in a common control and monitoring system.

In some embodiments all of the monitoring functions of the integrated monitoring and control system can be performed with a commonly shared pair or larger array of thermoacoustic sensors that function as both combustion dynamics thermoacoustic vibration/wave receivers and acoustic transmitters. In such an integrated thermoacoustic pressure-based sensor and monitoring/control system, the controller correlates performance of an combustion thermoacoustic properties in order to identify combustion anomalies by wavelet or Fourier analysis techniques; determine bulk temperature characteristics within the combustor with dominant mode frequency analysis techniques and determine absolute active path temperatures within the combustor with acoustic transmission and time-of-flight analysis techniques of acoustic pyrometry.

Embodiments of this monitoring and control system with multi-function sensors operate by evaluating dynamic pressure sensor data for combustion anomalies while also monitoring accurate combustion gas temperature continuously in real time. Once the monitoring and control system detects that there is a fault anomaly it evaluates the fault in conjunction with the monitored combustor gas temperature to classify or determine the type of fault. This system classifies various types of developing combustion anomalies, with the ability to predict flame on, flame out, flashback. The system embodiments also monitor vibratory responses and resonances (low, intermediate and high frequency dynamics) of the combustor basket. As mentioned, accurate real time, continuous active absolute path temperature monitoring and/or bulk mean temperature monitoring by embodiments of the monitoring/control system are available for optimizing engine control and performance. Embodiments of the system of the present invention are implemented in any type of known combustor structure, whether of can, can-annular or annular construction, to control and regulate the gas turbine combustion control process during engine operation.

Embodiments of the invention are directed to methods for detecting and classifying combustion anomalies in a combustor of a gas turbine engine by placing in a gas turbine combustor at least two thermoacoustic sensors capable of generating respective sensor output signals indicative of combustion thermoacoustic oscillations in the combustor and coupling the sensors to a controller that is capable of correlating sensor output signals with combustion conditions. Dynamic sensor output signals are generated with the thermoacoustic sensors. A wavelet or Fourier spectral analysis of the dynamic sensor output signals is performed with the controller, in order to determine whether a combustion anomaly has occurred. In the method of this embodiment temperature within the combustor is monitored with the thermoacoustic sensors by performing one or both of bulk temperature frequency analysis of the dynamic sensor output signals or active path temperature monitoring of the dynamic sensor output signals by acoustic pyrometry. The anomaly is classified with the controller based on the wavelet or the Fourier spectral analysis and the monitored temperature.

Other embodiments of the invention are directed to systems for detecting and classifying combustion anomalies in a combustor of a gas turbine engine. The systems comprise at least two thermoacoustic sensors oriented in a gas turbine combustor, the sensors capable of generating respective sensor output signals indicative of combustion thermoacoustic oscillations in the combustor and a controller, coupled to the sensors, that is capable of correlating sensor output signals with combustion conditions. The controller performs the correlation by receiving from the thermoacoustic sensors dynamic sensor output signals and performs a wavelet or Fourier spectral analysis of the dynamic sensor output signals, to determine whether a combustion anomaly has occurred. The controller also monitors temperature within the combustor with the thermoacoustic sensors by performing one or both of bulk temperature frequency analysis of the dynamic sensor output signals or active path temperature monitoring of the dynamic sensor output signals by acoustic pyrometry. The controller classifies the anomaly based on the wavelet or Fourier spectral analysis and the monitored temperature.

Additional embodiments of the invention are directed to a gas turbine apparatus, comprising a compressor section; a combustor section including a plurality of combustors, each combustor having an injector system for regulating fuel/air mixture; a turbine section; and a system for detecting and classifying combustion anomalies. The combustion anomaly detection system includes at least two thermoacoustic sensors oriented in a gas turbine combustor. The sensors are capable of generating respective sensor output signals indicative of combustion thermoacoustic oscillations in the combustor. A controller is coupled to the sensors, that is capable of correlating sensor output signals with combustion conditions by receiving from the thermoacoustic sensors dynamic sensor output signals. The controller then performs a wavelet or Fourier spectral analysis of the dynamic sensor output signals, to determine whether a combustion anomaly has occurred. The controller monitors temperature within the combustor with the thermoacoustic sensors by performing one or both of bulk temperature frequency analysis of the dynamic sensor output signals or active path temperature monitoring of the dynamic sensor output signals by acoustic pyrometry. The controller classifies the anomaly based on the wavelet or Fourier spectral analysis and the monitored temperature.

The respective objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a combustion monitoring and control system that can identify and classify combustion anomalies, and also actively control the gas turbine combustion process within the engine combustors. Some embodiments of the methods and system incorporate one or more thermoacoustic dynamic pressure sensors that are selectively oriented or arrayed in the combustor. The thermoacoustic sensors measure vibratory responses of the combustor that are generated within the combustion process. Sensor outputs are utilized in the monitoring and control system controller to identify anomalies using wavelet or Fourier analysis techniques. In some embodiments bulk temperature is also monitored using dominant mode acoustic frequency analysis techniques.

In some embodiments, acoustic pyrometry-based active temperature monitoring is incorporated into the monitoring and control system, alone or with other embodiments of the invention described herein, by addition of an acoustic transmitter or acoustic transceiver that transmits a sound wave in a line-of-sight with at least one or a plurality of thermoacoustic sensors. Sound transmission time-of-flight is measured by the controller and correlated with path temperature along the line-of-sight. In some embodiments the active path temperature is processed by the controller to determine combustor bulk temperature. Path(s) of acoustic transmission across the combustor gas path serve as the absolute temperature measurement and can be used for calibrating the passive bulk temperature measurement using the dominant mode approach. Thus the active path temperature determined by acoustic pyrometry methods can be utilized as the second temperature reading for calibrating and corroborating acoustic frequency based bulk temperature monitoring systems, when they are incorporated in a common control and monitoring system.

The monitoring functions of the integrated monitoring and control system can be performed with a commonly shared array of thermoacoustic sensors that function as both combustion dynamics thermoacoustic vibration/wave receivers and acoustic transmitters. In such embodiments at least one sensor performs a transmitter function and at least one performs a receiver function. Preferably at least two or more receiving sensors are employed in an array. In such an integrated thermoacoustic pressure-based sensor and monitoring/control system embodiment, the controller correlates thermoacoustic sensor outputs with combustion properties, in order to: identify combustion anomalies by wavelet or Fourier analysis techniques; determine bulk temperature characteristics within the combustor with dominant mode frequency analysis techniques and determine absolute active path temperatures within the combustor with transmission and time-of-flight pyroacoustic analysis techniques.

Monitoring and Control System Structure

Figure 1:
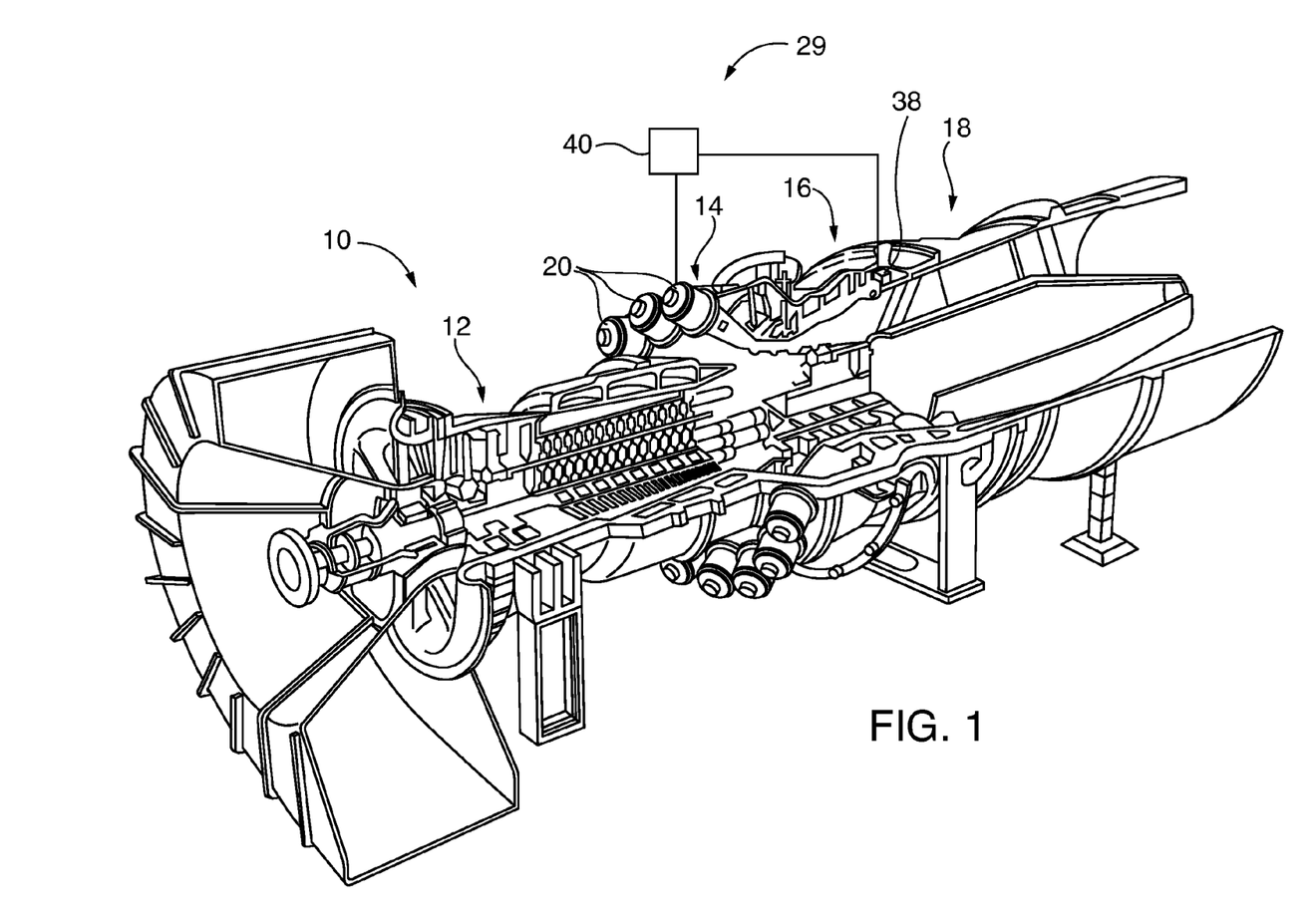
FIG. 1 is a perspective cross-sectional view of a gas turbine engine illustrating implementation of a system for determining combustor active temperature and/or combustion anomalies and classification of those anomalies, in accordance with embodiments of the present invention.
Figure 2:
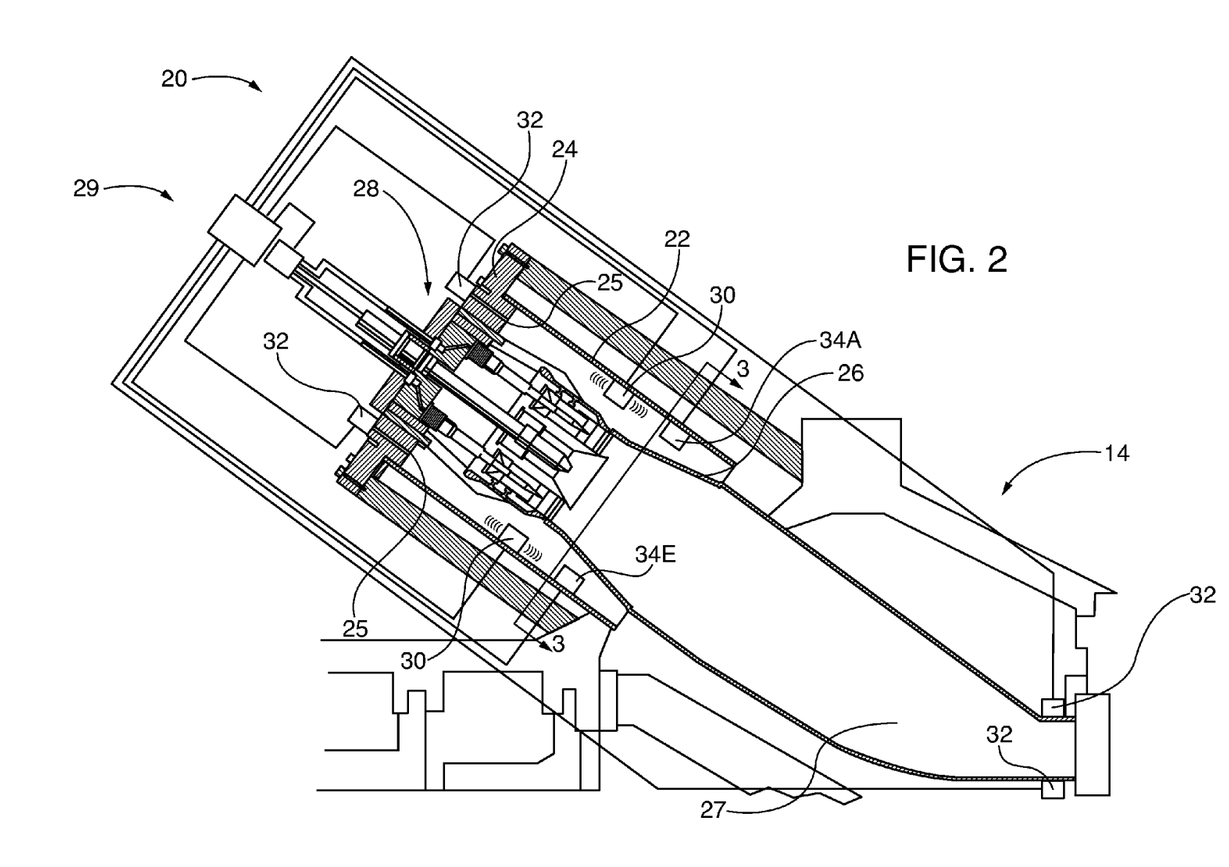
FIG. 2 is a cross-sectional view of a gas turbine combustor incorporating an embodiment of a system for determining combustor active temperature and/or combustion anomalies and classification of those anomalies, in accordance with embodiments of the present invention.

Referring to FIGS. 1 and 2 an exemplary industrial gas turbine (IGT) engine 10 is shown. The exemplary engine 10 includes a compressor section 12, a combustor section 14, a turbine section 16, and an exhaust section or system 18. The combustor section 14 includes a plurality of combustors 20. Each combustor 20 has a combustion shell 22 a cover plate 24 and one or more optional pressure ports 25. The combustor liner or basket 26 and transition duct 27 define a passage for conveying hot working gas to the turbine section 16. The system of the present invention is operable with known combustor geometry gas turbine engine designs, including can, can-annular or annular construction combustors in stationary land-based or vehicular applications.

During operation of the gas turbine engine 10, compressed air from the compressor section 12 is provided to the combustor section 14 where it is combined with fuel supplied by fuel injection system 28 in the combustors 14. The fuel/air mixture is ignited to form combustion products comprising the hot working gas. It may be understood that combustion of the fuel and air may occur at various axial locations along the passage through the combustor liner or basket 26 and the transition duct 27 to the inlet of the turbine section 16. The hot working gas is expanded through the turbine section 16 and is exhausted through the exhaust section/system 18.

Referring to FIGS. 1 and 2, in accordance with an aspect of the invention, a combustion monitoring and control system 29 is provided, which can identify and classify combustion anomalies and actively control the gas turbine combustion process within one or more of the gas turbine engine 10 combustors 20. In this regard, the engine 10 may include may comprise one or more of the monitoring and control system(s) 29: e.g., one system 29 for each combustor 20, or a single system 29 may service each combustor 14 of the engine 10. Similarly, clusters of combustors 20 may be served by one system 29, with other cluster(s) being served by other systems. Thus the consolidated monitoring system for an gas turbine 10 can determine deviations between respective combustors and compare their relative performance no matter what engine combustor structure or orientation is employed by the engine design: whether a stationary, land-based turbine engine or a vehicular engine for aero, marine or land vehicular applications.

Figure 3:
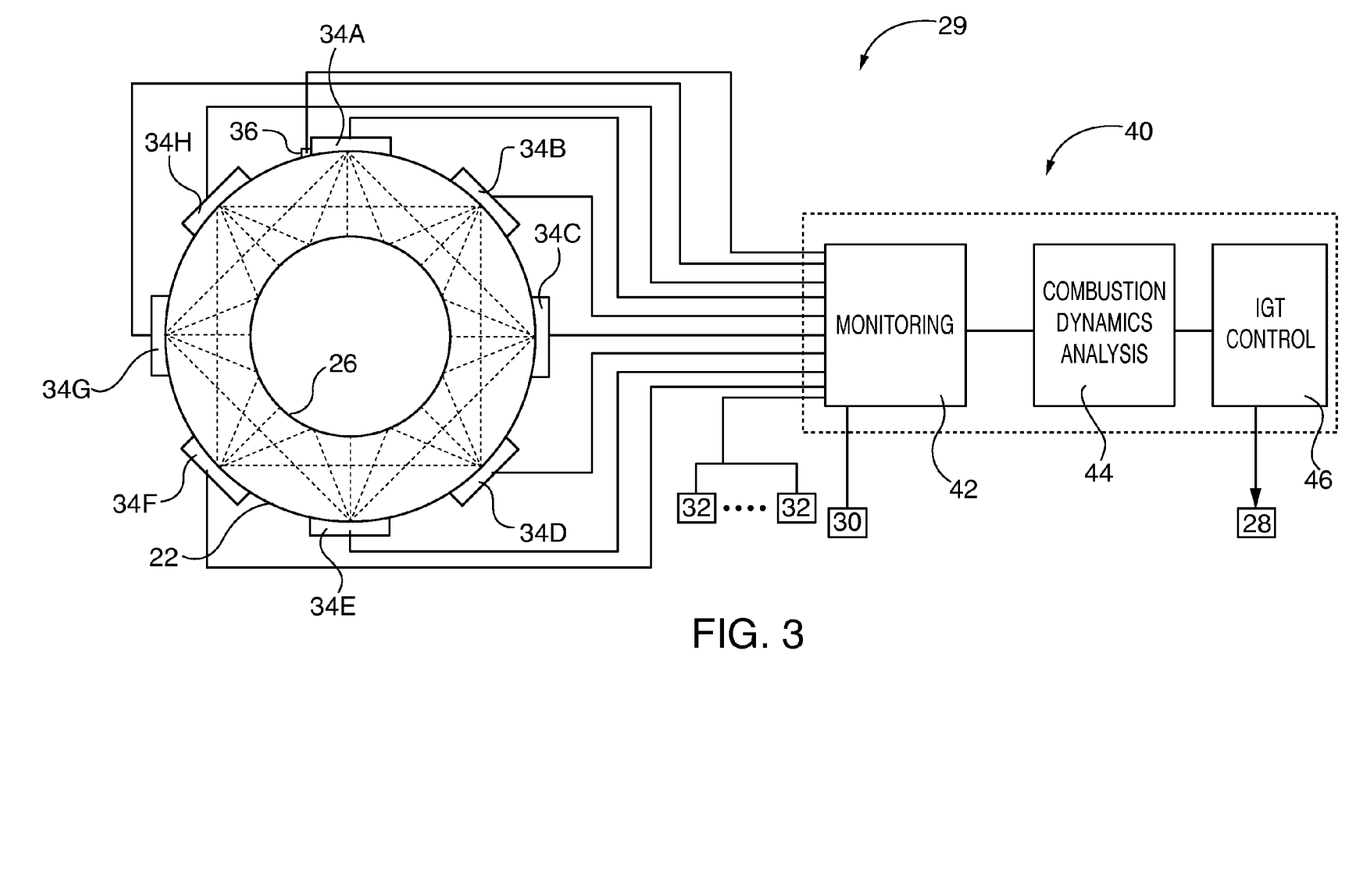
FIG. 3 is a cross-sectional view of another embodiment of the system for determining combustor active temperature and/or combustion anomalies and classification of those anomalies, in accordance with aspects of the present invention.

As shown in FIGS. 2 and 3 the system 29 includes an array of a plurality of thermoacoustic sensors that are capable of generating respective sensor output signals indicative of combustion thermoacoustic oscillations in each respective monitored and controlled combustor 20. Other system embodiments can be constructed with at least one, but preferably at least or more thermoacoustic sensors. Acoustic frequencies and amplitudes sensed by those acoustic sensors are generated as a result of combustion events in the working combustion gas, defining acoustic sources that occur within the combustor 20 hot gas path. The monitoring and control system 29 is configured to transform the sensed thermoacoustic oscillation information into a form that enables the occurrence of combustion anomalies of interest to be discerned. As such, flame flashback events and other types of combustion anomalies of interest may be detected and extracted from sensed thermoacoustic oscillations in the combustor 14 that are monitored by sensors positioned in and/or around the combustor 14. Depending upon the system 29 configurations and application, the thermoacoustic sensors comprise any combination of one or more of a dynamic pressure sensor, a microphone, an optical sensor or an ionic sensor turbine inlet sensor. Pressure sensors sense the amplitudes of thermoacoustic oscillations in the combustor 20 as well as pulsation frequencies. A high temperature microphone may be utilized to measure acoustic fluctuations in the combustor 14. An optical sensor may be utilized to measure a dynamic optical signal within the combustor 20. An ionic sensor may be utilized to measure dynamic ionic activity within the combustor 20.

An exemplary thermoacoustic sensor array shown schematically in FIG. 2 comprises a known construction acoustic transmitter 30, and a plurality of known dynamic pressure sensors 32 that are arrayed axially and radially within the combustor 20 by known mounting structures and methods, such as J tubes or rakes. Particularly, a pair of sensors 32 is coupled to the cover plate 24 and is in pressure communication with the combustor working gasses through respective pressure ports 25. Other exemplary sensors 32 and 34 are arrayed axially downstream from the cover plate 24 within the combustor shell 22 proximal the combustor basket or liner 26, in the so-called primary zone (PZ) and proximal the transition 27 junction with the turbine section 16. The sensor 34A and 34E locations in the PZ are useful for measuring primary zone temperature PZT. The sensor 32 location proximal the transition 27 junction with the turbine section 16 is useful for measuring the turbine inlet temperature TIT. In FIG. 3 the sensors are radially/circumferentially arrayed transceivers 34A-34H that are capable of transmitting and receiving acoustic oscillation waves along the line-of-sight paths shown in dashed lines. While some of the sensors in FIG. 3 are circumferentially arrayed around the combustor shell 22 alternatively they may be arrayed about the combustor liner 26 or the transition 27. Other types of known sensors, such as individual thermocouple temperature sensors or thermocouple arrays may be employed within the gas turbine. For example in FIGS. 1 and 3 thermocouple 36 measures combustion temperature in the combustor 20 and thermocouple 38 measures exhaust temperature in the exhaust system 18.

Figure 4:
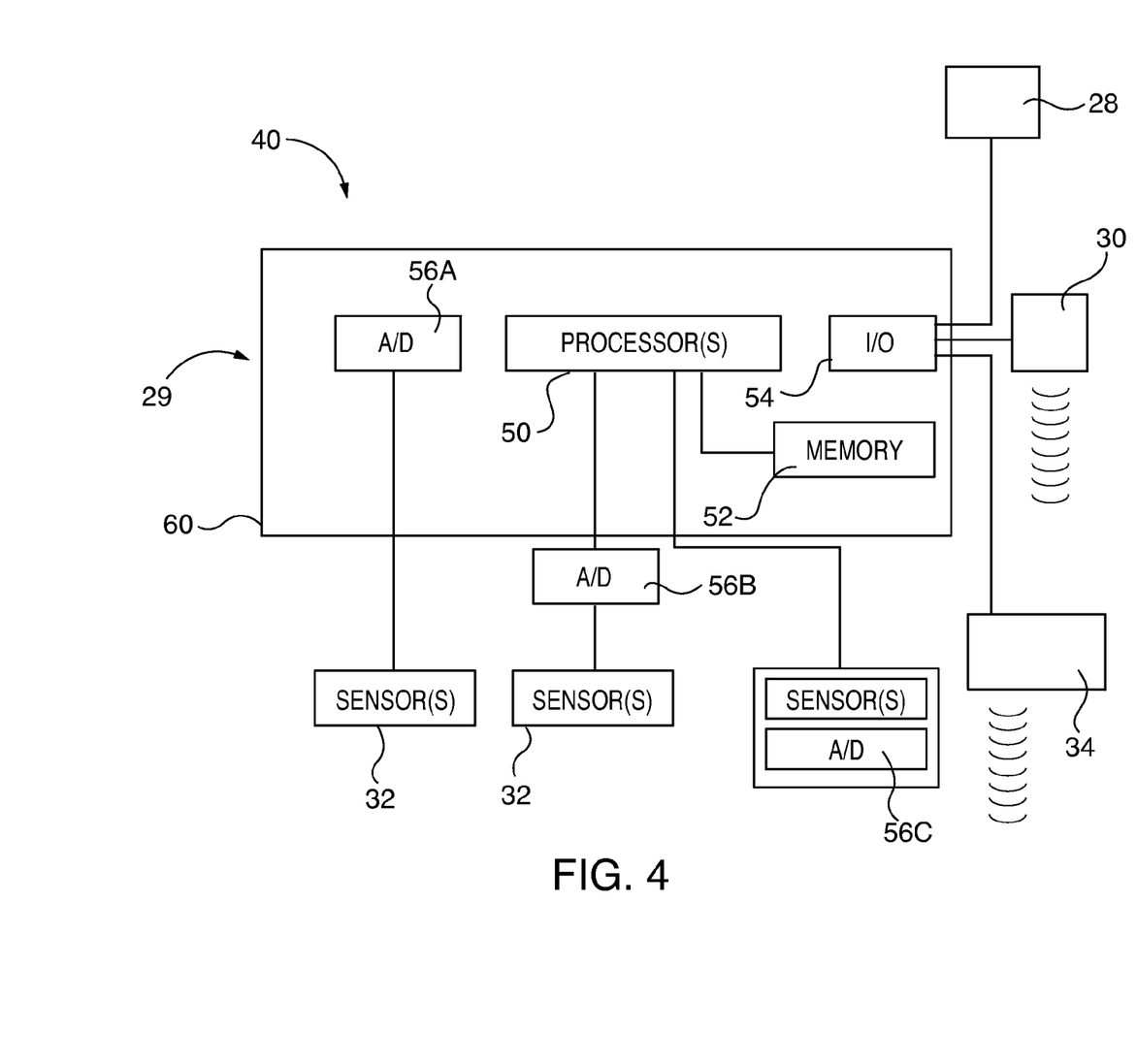
FIG. 4 is a block diagram of an embodiment of a controller for implementing embodiments of the present invention in the system for determining combustor active temperature and/or combustion anomalies and classification of those anomalies.

As shown in greater detail in FIGS. 3 and 4, the monitoring and control system 29 comprises a controller 40, coupled to the sensors 30, 32, that is capable of correlating sensor output signals with combustion temperature in a monitoring section 42 and conducting combustion dynamics analysis of the combustion process in an analysis section 44. The monitoring section 42 and dynamic analysis 44 section outputs are utilized by the gas turbine control system 46 that can send control signals to other gas turbine controls subsystems, including industrial gas turbine (IGT) controls subsystems, such as the fuel injection system 28, in order to unload or shut down the engine 10 in response to changes in monitored combustion conditions within the combustor 20.

Referring to the exemplary controller 40 embodiment shown in FIG. 3, it includes one or more processors 50, system memory 52 and input/output control devices 54 for interfacing with the associated engine 10 controls, such as the fuel injection control system 28, acoustic transmitters 30, sensors 32 and acoustic transceivers 34, networks, other computing devices, human machine interfaces for operator/users, etc. The controller 40 may also include one or more analog to digital converters 56A and/or other components necessary to allow the controller 40 to interface with the sensors 32, transceivers 34 and/or other system components to receive analog sensor information. Alternatively, and/or additionally, the system 29 may include one or more analog to digital converters 56B that interface between the sensors 32, transceivers 34 and the controller 40. As yet a further example, certain sensors 32 or transceivers 34 may have an analog to digital converter 56C integral therewith, or are otherwise able to communicate digital representations of sensed information directly to the controller 40

The processor(s) 50 may include one or more processing devices such as a general purpose computer, microcomputer or microcontroller. The processors 50 may also comprise one or more processing devices such as a central processing unit, dedicated digital signal processor (DSP), programmable and/or reprogrammable technology and/or specialized component, such as application specific integrated circuit (ASIC), programmable gate array (e.g., PGA, FPGA).

The memory 66 may include areas for storing computer program code executable by the processor(s) 50, and areas for storing data utilized for processing, e.g., memory areas for computing wavelet transforms, Fourier transforms or other executed mathematical operations used to operate the monitoring and control system 29, as described more fully herein below. As such, various aspects of the present invention may be implemented as a computer program product having code configured to perform the detection of combustion engine anomalies of interest, combustion dynamics and engine control functions as set out in greater detail herein.

In this regard, the processor(s) 50 and/or memory 52 are programmed with sufficient code, variables, configuration files, etc., to enable the controller 40 to perform its designated monitoring and control functions. For example, the controller 40 may be operatively configured to sense thermoacoustic conditions, analyze thermoacoustic conditions based upon inputs from one or more sensors 32, 34, control features of the gas turbine engine 10 in response to its analysis, and/or report results of its analysis to operators, users, other computer processes, etc. as set out in greater detail herein. Thus, all of the dynamic output signals originating from sensors 32, 34 may be communicated to a single processor 50. In this implementation, the single processor 50 will process the sensor dynamic output signals using the data analysis and control functions described in greater detail herein, such that it appears as if the results are computed in a generally parallel fashion. Alternatively, more processors 50 can be used and each processor may be utilized to process one or more sensor 32, 34 dynamic signals, e.g., depending for example, upon the computation power of each processor.

Monitoring and Control System Operation

Figure 5:
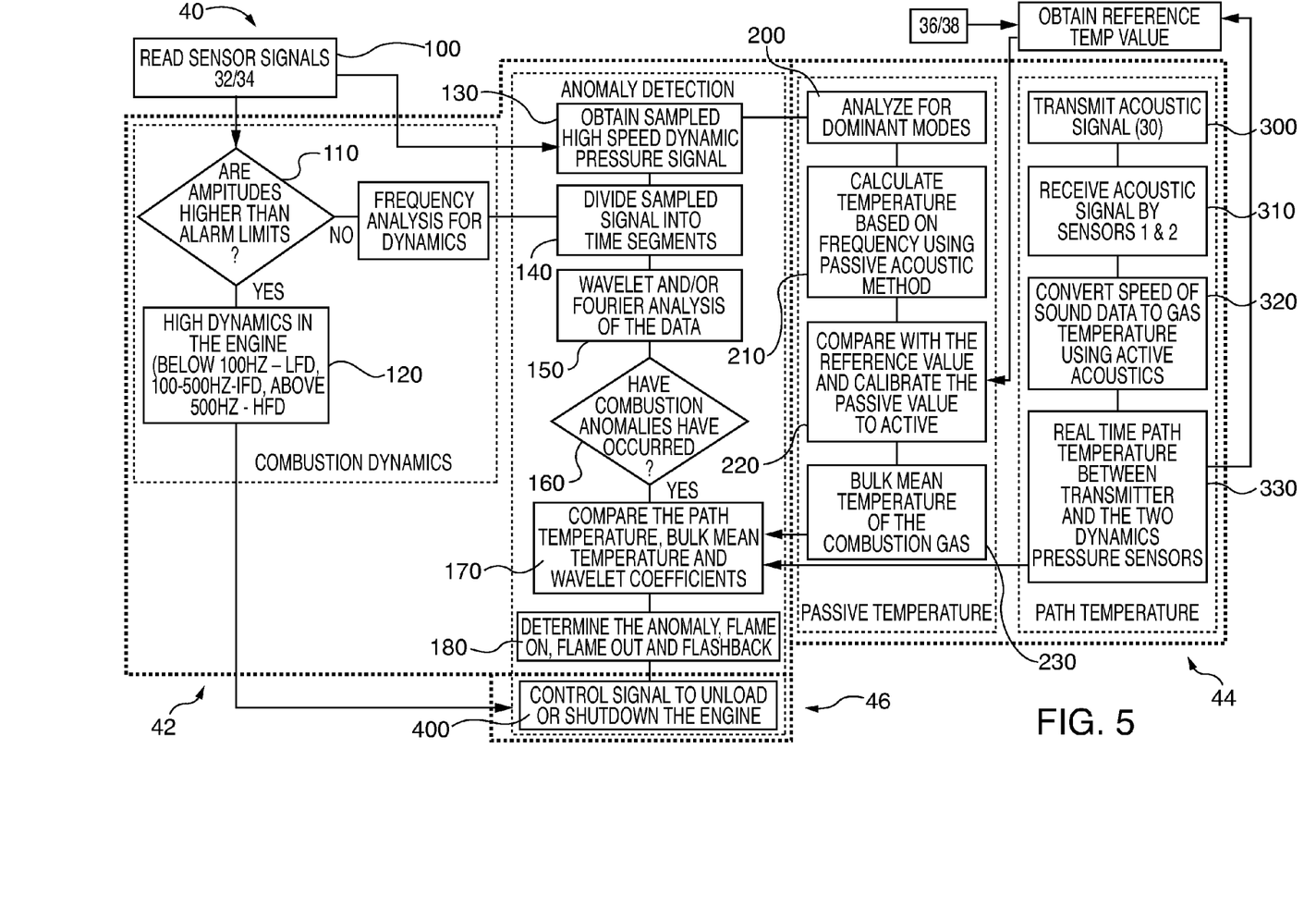
FIG. 5 is a flow chart illustrating implementation of an embodiment of the methods for determining combustor active temperature and/or combustion anomalies and classification of those anomalies, in accordance with embodiments of the present invention.

FIG. 5 is a flow chart illustrating graphically exemplary operation of a monitoring and control system 29 embodiment of the invention. The thick dotted line operational blocks relate to previously described combustion dynamics analysis 42, temperature monitoring and determination 44 and gas turbine control 46 functions (including by way of example IGT control functions) that are performed within the controller 40. In step 100 sensor signals generated by the sensors 32, 34 are read. In step 110 amplitudes of the sensor signals are compared to previously established alarm limits. For example in IGT applications the step 120 low frequency dynamics (LFD) below 100 Hz are of importance because of potential resonance influence at the 50 Hz or 60 Hz engine rotational speed. Other frequency bands of interest are intermediate frequency dynamics (IFD) between approximately 100-500 Hz and high frequency dynamics (HFD) above 500 Hz. If an alarm limit is exceeded the controller 40 sends a control command, for example to the fuel injection system 28, to unload or shut down the gas turbine engine 10 in step 400.

If an alarm limit is not exceeded in step 110, then frequency analysis for dynamics is performed in anomaly detection portion of the combustion dynamics analysis sub system. An exemplary description of how to perform anomaly detection is in U.S. Pat. No. 7,853,433 that is incorporated herein by reference. The sampled high speed dynamic pressure signal is obtained from the sensors in step 130 and time divided into segments in step 140. In step 150 the time-time divided sample segments are analyzed using the wavelet analysis technique described in U.S. Pat. No. 7,853,433. Alternatively, a known Fourier spectral analysis that converts the time segments into frequency space, analyzes dominant frequencies by identifying the peak frequencies and their respective amplitudes, and identifies amplitudes exceeding defined thresholds. If it is determined that a combustion anomaly or anomalies have occurred in step 160 the combustor temperature as determined in the temperature monitoring and determination subsystem 44 is compared with the anomaly information obtained by the Fourier or wavelet analysis techniques, or both. In step 180 the anomaly classification as a flame on, flame out or flashback is made in conjunction with the passive or path temperature information obtained from the temperature monitoring and determination subsystem 44. For example in an gas turbine flameout the combustor temperature drops off dramatically. Conversely in a flashback scenario the combustor temperature rises dramatically upstream within the combustor 14. When the anomaly determination is made in step 180 appropriate control signals to unload or shut down the engine are made in the gas turbine control system 46.

The temperature monitoring and determination subsystem 44 may comprise passive temperature determination utilizing the passive acoustic method described in United States Patent Application "Temperature Measurement in a Gas Turbine Engine Combustor, filed on Mar. 14, 2013, Ser. No. 13/804,132, incorporated by reference herein, and/or real time actual path temperature determination within the combustor 14 by adaptation of the acoustic pyrometry technique for gas turbine exhaust system temperature determination described in United States Patent Publication No. US2012/0150413 (also incorporated by reference herein).

In the passive temperature determination method, sampled high speed dynamic pressure signals from the sensors 32/34, such as obtained in step 130 are analyzed for dominant modes in step 200. Combustor temperature is calculated based on frequency using the passive acoustic method in step 210. The passive value is calibrated with a reference temperature value in step 220 in order to obtain an active temperature value within the combustor 14. The calibrated passive temperature value determined in step 220 is utilized in step 230 to determine the bulk mean temperature of the combustion gas in step 230. The reference temperature value used in step 220 may be obtained from one or more thermocouples 36 in the combustor or thermocouples 38 located in the exhaust system 18. The reference temperature value may be an actual path temperature measured in the exhaust system 18, as described in United States Patent Publication No. US2012/0150413 or a real time path temperature measured in the combustor 14 that is determined in steps 300-330.

The real time path temperature is measured by transmitting one or more acoustic signals in an acoustic transmitter 30 or transceiver 34. At least one, preferably two or more sensors receive the acoustic signal(s) in step 310. The sound data are converted to gas temperature using active acoustics in step 320, such as by utilization of the methods described in the aforementioned. United States Patent Publication No. US2012/0150413 that is incorporated by reference herein. The real time path temperature that is determined in step 330 is the localized active temperature value along the transmission path. A plurality of active temperature values measured along different acoustic paths by performing the steps 300-330 can be utilized to determine the combustor 14 bulk temperatures, alone or in parallel with the dominant frequency passive acoustic method of steps 200-230. While a single path active temperature measurement between a single transmitter 30 and acoustic sensor 32 provides useful control information, arraying a plurality of sensors 30, 32 and/or 34 selectively in any axial, circumferential and/or radial pattern or combinations thereof within a combustor 14 or series of combustors 14 facilitates active real time two- or three-dimensional combustion temperature monitoring within the gas turbine engine 10.

The real time path temperature determined in steps 300-330 can be utilized as an input for other monitoring and control functions, with or without one or more of the combustion dynamics analysis 42, passive temperature monitoring and determination 44 and gas turbine control 46 functions described in the exemplary integrated monitoring and control system 29 described herein. For example combustor turbine inlet temperature (TIT) can be actively monitored in real time and used as a control parameter for the combustion process. The combustion active path temperature determined in steps 300-330 can be utilized to control the fuel/air mixture in the combustor 14 via the fuel injection system 28.

Combustor active temperature monitoring utilizing the system and method embodiments described herein with thermoacoustic sensors is believed to provide faster temperature change response than known thermocouple-based temperature monitoring systems and do not require inferred back calculation/calibration of combustor temperature by resorting to use of a separately obtained reference temperature.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The exemplary engine 10 and exemplary combustor 14 are shown by way of illustration and not by way of limitation, to clearly describe certain features and aspects of the present invention set out in greater detail herein. However, the various aspects of the present invention described more fully herein may be applied to various combustion engines to monitor and/or detect the occurrence of combustion anomalies. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for detecting and classifying combustion anomalies in a combustor of a gas turbine engine, comprising:

placing in a gas turbine combustor at least two thermoacoustic sensors capable of generating respective sensor output signals indicative of combustion thermoacoustic oscillations in the combustor and coupling the sensors to a controller that is capable of correlating sensor output signals with combustion conditions;

generating dynamic sensor output signals with the thermoacoustic sensors;

performing a wavelet or Fourier spectral analysis of the dynamic sensor output signals with the controller, to determine whether a combustion anomaly has occurred;

monitoring temperature within the combustor with the thermoacoustic sensors by performing one or both of:

bulk temperature frequency analysis of the dynamic sensor output signals; or active path temperature monitoring of the dynamic sensor output signals by acoustic pyrometry; and classifying the anomaly with the controller based on the wavelet or the Fourier spectral analysis and the monitored temperature.

2. The method of claim 1, the wavelet analysis of each respective dynamic sensor output signal is performed in the controller by:

dividing the dynamic sensor output signal into time segments to derive a plurality of data points for each of the time segments;

transforming the sampled dynamic signal by performing a wavelet transform to calculate wavelet coefficients for the data points within the processed time segment, targeting at least one region of interest within the wavelet transformed segment and normalizing amplitude of the wavelet coefficients within each targeted region by a baseline signal; and determining whether any combustion anomalies have occurred during each of the time segments using the normalized amplitudes of the wavelet coefficients within each targeted region by comparing the respective normalized amplitudes of the wavelet coefficients within each target region to a predetermined threshold amplitude.

3. The method of claim 1, the bulk temperature monitoring is performed in the controller by:

identifying one or more acoustic frequencies in the dynamic sensor output signal of a thermoacoustic sensor at a first location in the combustor;

determining, for each of the one or more acoustic frequencies, a bulk first temperature value, at the first sensor location that is directly proportional to each one of the one or more acoustic frequencies and a calculated constant value corresponding to each of the one or more acoustic frequencies;

determining a second temperature in the engine with an alternative temperature monitoring method;

based on the second temperature, determining a calculated temperature value at the first location;

comparing the first temperature value determined for each of the one or more frequencies at the first location to the calculated temperature value and, for each of the one or more frequencies, changing the calculated constant values to recalculated constant values based on the comparison; and determining subsequent bulk first temperature values at the first location based on further identified acoustic frequencies.

4. The method of claim 3, the determining subsequent bulk first temperature values at the first location also based on further recalculated constant values.

5. The method of claim 3, the second temperature determined at a location within an exhaust system of the gas turbine.

6. The method of claim 1, the active path temperature monitoring within the combustor of each respective dynamic sensor output signal is performed in the controller by:

transmitting acoustic signals from at least one thermoacoustic transmitter that is located in the combustor;

receiving the acoustic signals from the acoustic transmitter by at least one thermoacoustic sensors located at a predetermined location within the combustor in a distinct line-of-sound path from the transmitter;

determining a time-of-flight for the signals traveling along each of the line of sound paths; and processing the time-of-flight for the signals traveling along the line of sound paths to determine the path temperature.

7. The method of claim 1, the wavelet or Fourier spectral analysis anomaly detection and temperature monitoring performed with common thermoacoustic sensors.

8. The method of claim 1, the classifying performed with a plurality of monitored temperatures monitored at different locations within the combustor.

* * * * *